United States Patent
Ogawa

(10) Patent No.: US 10,706,844 B2
(45) Date of Patent: Jul. 7, 2020

(54) INFORMATION PROCESSING SYSTEM AND INFORMATION PROCESSING METHOD FOR SPEECH RECOGNITION

(71) Applicant: SONY CORPORATION, Tokyo (JP)

(72) Inventor: Hiroaki Ogawa, Chiba (JP)

(73) Assignee: SONY CORPORATION, Tokyo (JP)

( * ) Notice: Subject to any disclaimer, the term of this patent is extended or adjusted under 35 U.S.C. 154(b) by 2 days.

(21) Appl. No.: 15/571,392

(22) PCT Filed: May 6, 2016

(86) PCT No.: PCT/JP2016/063631
§ 371 (c)(1),
(2) Date: Nov. 2, 2017

(87) PCT Pub. No.: WO2016/190060
PCT Pub. Date: Dec. 1, 2016

(65) Prior Publication Data
US 2018/0137861 A1    May 17, 2018

(30) Foreign Application Priority Data

May 22, 2015 (JP) ................................ 2015-104706

(51) Int. Cl.
*G10L 15/22* (2006.01)
*G06F 1/16* (2006.01)
(Continued)

(52) U.S. Cl.
CPC .............. *G10L 15/22* (2013.01); *G06F 1/163* (2013.01); *G06F 1/1694* (2013.01); *G06F 3/017* (2013.01);
(Continued)

(58) Field of Classification Search
USPC .......................... 704/246, 247, 251, 252, 275
See application file for complete search history.

(56) References Cited

U.S. PATENT DOCUMENTS

| 9,946,862 B2 * | 4/2018 | Yun ......................... G06F 3/167 |
| 2005/0131687 A1 * | 6/2005 | Sorrentino .............. G10L 15/28 704/235 |

(Continued)

FOREIGN PATENT DOCUMENTS

| CN | 104620257 A | 5/2015 |
| JP | 07-064480 A | 3/1995 |

(Continued)

OTHER PUBLICATIONS

International Search Report and Written Opinion of PCT Application No. PCT/JP2016/063631, dated Jun. 21, 2016, 12 pages of ISRWO.

*Primary Examiner* — Leonard Saint Cyr
(74) *Attorney, Agent, or Firm* — Chip Law Group

(57) ABSTRACT

The present disclosure relates to an information processing apparatus, an information processing method, and a program that are capable of providing better user experience. An information processing apparatus includes an activation word setting unit that sets, on the basis of a detection result of detecting a user operation, a word used as an activation word for activating a predetermined function, the activation word being uttered by a user, the number of activation words being increased or decreased by the setting; and an activation word recognition unit that performs speech recognition on speech uttered by the user and recognizes that the word set by the activation word setting unit to be used as the activation word is uttered. The present technology is applicable to, for example, a wearable terminal provided with a speech recognition function.

14 Claims, 10 Drawing Sheets

(51) Int. Cl.
 *G06F 3/01* (2006.01)
 *G10L 15/08* (2006.01)
 *G06F 3/16* (2006.01)
(52) U.S. Cl.
 CPC .............. *G10L 15/08* (2013.01); *G06F 3/167* (2013.01); *G10L 2015/088* (2013.01); *G10L 2015/223* (2013.01)

(56) References Cited

U.S. PATENT DOCUMENTS

| | | | |
|---|---|---|---|
| 2005/0134117 A1 | 6/2005 | Ito et al. | |
| 2008/0300886 A1* | 12/2008 | Patch | 704/275 |
| 2010/0169098 A1* | 7/2010 | Patch | 704/275 |
| 2011/0004477 A1* | 1/2011 | Bansal | H04N 5/781 704/275 |
| 2011/0301943 A1* | 12/2011 | Patch | G10L 15/265 704/9 |
| 2013/0294753 A1* | 11/2013 | Bansal | H04N 5/781 386/291 |
| 2015/0025885 A1* | 1/2015 | Patch | G10L 15/265 704/235 |
| 2015/0046157 A1* | 2/2015 | Wolff | G10L 15/22 704/231 |
| 2015/0100323 A1 | 4/2015 | Kozuka et al. | |
| 2015/0261496 A1* | 9/2015 | Faaborg | G06F 3/167 715/728 |
| 2017/0154176 A1* | 6/2017 | Yun | G06F 3/167 |

FOREIGN PATENT DOCUMENTS

| | | |
|---|---|---|
| JP | 09-114634 A | 5/1997 |
| JP | 2002-132290 A | 5/2002 |
| JP | 2005-178473 A | 7/2005 |
| JP | 2015-076877 A | 4/2015 |
| JP | 2015-526753 A | 9/2015 |
| KR | 10-2015-0044874 A | 4/2015 |
| WO | 2002/035518 A1 | 5/2002 |
| WO | 2013/188002 A1 | 12/2013 |

\* cited by examiner

| Word | Sensor pattern (start) | Sensor pattern (finish) |
|---|---|---|
| "Abracadabra" | 35.6197 degrees of north latitude, 139.728553 degrees of east longitude, in the range of 10 m | 35.6197 degrees of north latitude, 139.728553 degrees of east longitude, outside the range of 10 m |
| "Jump" | User has jumped 3 times | 10 seconds have passed since start |
| "Acceleration apparatus" | User's walking speed is not less than 25 km/h | User's walking speed is less than 25 km/h |
| "Summon" | User has turned his/her face up | User has faced forward |

FIG.2

| Word |
|---|
| Hello smartphone |

| Word |
|---|
| Hello smartphone |
| Abracadabra |

| Word |
|---|
| Hello smartphone |

FIG.3

| Command | Time range | Sensor information |
|---|---|---|
| "Emit beam" | Within 3 seconds after uttering speech | Direction in which right hand has been swung down |
| "Launch rocket" | Right after uttering | Direction in which body faces |
| "Mow down" | From beginning of speech section 0.1 seconds before to end of speech and sensor information | Range of direction in which right hand has faced |
| "Mark here" | End time of word "here" in speech recognition result | Direction in which face of user has faced, position of user |

FIG.7

INFORMATION PROCESSING SYSTEM AND INFORMATION PROCESSING METHOD FOR SPEECH RECOGNITION

CROSS REFERENCE TO RELATED APPLICATIONS

This application is a U.S. National Phase of International Patent Application No. PCT/JP2016/063631 filed on May 6, 2016, which claims priority benefit of Japanese Patent Application No. JP 2015-104706 filed in the Japan Patent Office on May 22, 2015. Each of the above-referenced applications is hereby incorporated herein by reference in its entirety.

TECHNICAL FIELD

The present disclosure relates to an information processing apparatus, an information processing method, and a program, and particularly to an information processing apparatus, an information processing method, and a program that are capable of providing better user experience.

BACKGROUND ART

In recent years, wearable terminals such as an eyeglass-type terminal and a watch-type terminal have been developed as compact devices that a user can wear and carry around, and many wearable terminals are equipped with a speech recognition function for recognizing the speech uttered by a user. By making the speech recognition function of such a wearable terminal always available, it is possible to improve user's convenience. However, it is also predicted that the wearable terminal performs speech recognition in response to the user's talking to himself/herself, surrounding noise, or the like, and malfunction may occur in the case where the speech recognition function is always available.

For this reason, it is considered to provide the wearable terminal with an activation button for stopping the speech recognition function in normal time and activating the speech recognition function. However, in a compact wearable terminal, it is predicted that it is difficult to provide the activation button, or it is difficult to provide good operability to the activation button. In this regard, with consideration of user's convenience, a technology in which a predetermined activation word is set in the wearable terminal and a speech recognition function is activated for a certain period of time when the activation word is recognized has been developed.

Meanwhile, a technology that can deal with more complicated and specific input information by analyzing not only speech uttered by the user but also gesture of the user has been developed.

For example, Patent Literature 1 discloses an information processing apparatus capable of outputting information on an instruction object instructed by gesture by associating the speech recognition result obtained by speech recognition of uttered speech and the trajectory of the gesture with respect to a screen on the basis of the uttered speech and the time relation in which the gesture is input.

CITATION LIST

Patent Literature

Patent Literature 1: Japanese Patent Application Laid-open No. 1997-114634

DISCLOSURE OF INVENTION

Technical Problem

Incidentally, when executing an application using speech recognition in an existing wearable terminal, the user experience provided by the application may be compromised by uttering an activation word for activating a speech recognition function. For example, in the case where the application is a game providing a specific view of the world and a word unrelated to the view of the world is set as the activation word, uttering the word gives a feeling that separates the user from the view of the world provided by the application. It is desired to avoid such a loss of user experience and provide better user experience.

The present disclosure has been made in view of the above circumstances to provide better user experience.

Solution to Problem

An information processing apparatus according to an aspect of the present disclosure includes an activation word setting unit that sets, on the basis of a detection result of detecting a user operation, a word used as an activation word for activating a predetermined function, the activation word being uttered by a user, the number of activation words being increased or decreased by the setting; and an activation word recognition unit that performs speech recognition on speech uttered by the user and recognizes that the word set by the activation word setting unit to be used as the activation word is uttered.

An information processing method or a program according to an aspect of the present disclosure includes the steps of:

setting, on the basis of a detection result of detecting a user operation, a word used as an activation word for activating a predetermined function, the activation word being uttered by a user, the number of activation words being increased or decreased by the setting; and performing speech recognition on speech uttered by the user and recognizing that the word set to be used as the activation word is uttered.

In an aspect of the present disclosure, on the basis of a detection result of detecting a user operation, a word used as an activation word for activating a predetermined function is set, the activation word being uttered by a user, the number of activation words being increased or decreased by the setting; and speech recognition is performed on speech uttered by the user and it is recognized that the word set to be used as the activation word is uttered.

Advantageous Effects of Invention

In accordance with an aspect of the present disclosure, it is possible to provide better user experience.

BRIEF DESCRIPTION OF DRAWINGS

FIG. 2 is a diagram describing words and sensor patterns to be registered in a correspondence database.

FIG. 3 is a diagram describing words to be registered in an activation word database.

FIG. 7 is a diagram showing an example of a command database.

MODE(S) FOR CARRYING OUT THE INVENTION

Hereinafter, specific embodiments to which the present technology is applied will be described with reference to the drawings.

Figure 1:
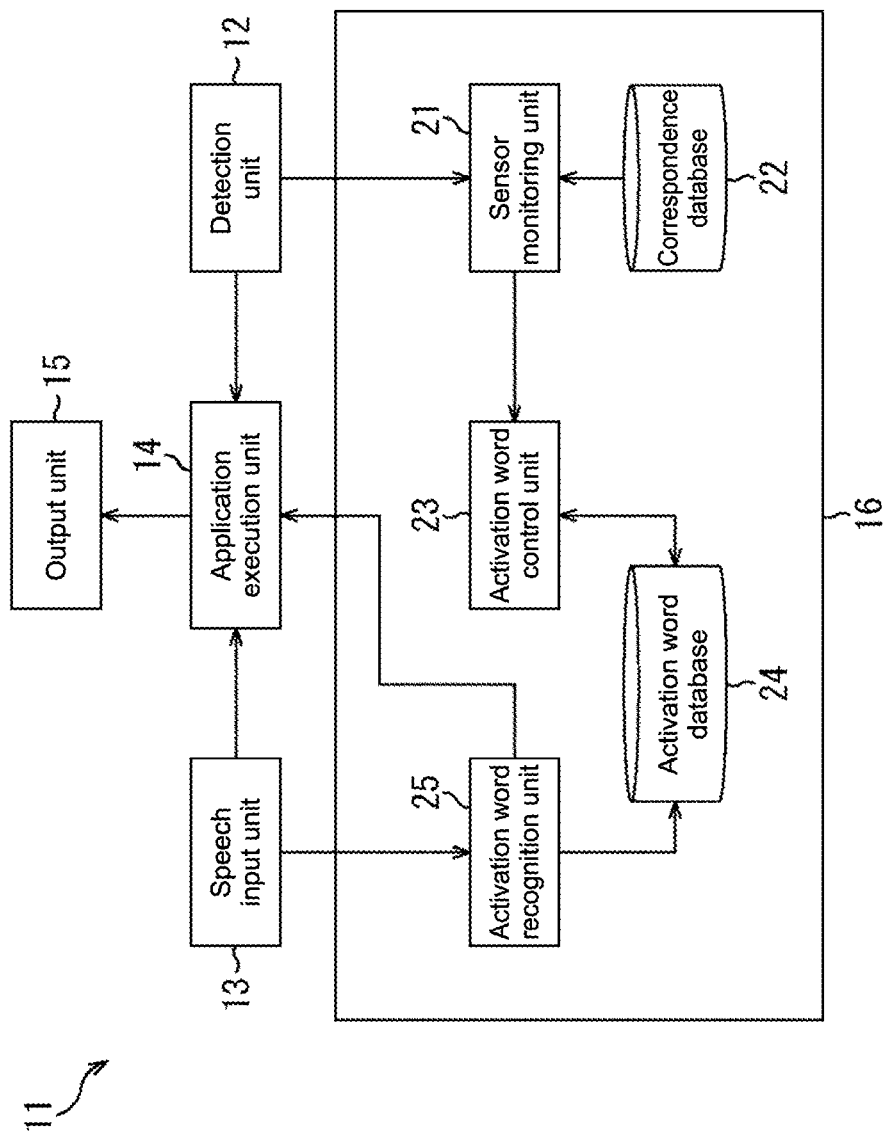
FIG. 1 is a block diagram showing a configuration example of a first embodiment of an information processing apparatus to which the present technology is applied.

FIG. 1 is a block diagram showing a configuration example of a first embodiment of an information processing apparatus to which the present technology is applied.

As shown in FIG. 1, an information processing apparatus 11 includes a detection unit 12, a speech input unit 13, an application execution unit 14, an output unit 15, and an activation word recognition control unit 16. For example, the information processing apparatus 11 is a wearable terminal that a user can wear and carry around, and is capable of activating the speech recognition function in response to the speech and action of the user to provide various kinds of user experience by an application using speech recognition.

The detection unit 12 includes, for example, various sensors such as a position sensor, a geomagnetic sensor, and a gyro sensor, and supplies the detection results detected by the sensors to the application execution unit 14 and the activation word recognition control unit 16. For example, the detection unit 12 supplies information on the current position of the information processing apparatus 11 detected by the position sensor to the application execution unit 14 and the activation word recognition control unit 16 as the detection result. Further, the detection unit 12 supplies information on the operation (information indicating what movement was made in which direction) of the information processing apparatus 11 detected by the geomagnetic sensor and the gyro sensor to the application execution unit 14 and the activation word recognition control unit 16 as the detection result.

The speech input unit 13 includes, for example, a microphone, converts the speech uttered by the user into an electric signal, and supplies the electric signal to the application execution unit 14 and the activation word recognition control unit 16.

The application execution unit 14 executes various applications using speech recognition. For example, the application execution unit 14 activates the speech recognition function only for a certain period of time from the timing when an activation word set to be used for activating the speech recognition function is recognized. Then, the application execution unit 14 recognizes the user's speech in the period during which the speech recognition function is active, and supplies an output corresponding to the application to be executed to the output unit 15 on the basis of the recognition result. Note that the configuration of the application execution unit 14 will be described later with reference to FIG. 6.

The output unit 15 includes, for example, a display, a speaker, and the like, and outputs sound from the speaker depending on the recognition result by the application executed in the application execution unit 14 and displays an image on the display.

The activation word recognition control unit 16 includes a sensor monitoring unit 21, a correspondence database 22, an activation word control unit 23, an activation word database 24, and an activation word recognition unit 25. Then, the activation word recognition control unit 16 performs control to increase or decrease the number of words used as activation words for activating the speech recognition function of the application execution unit 14 on the basis of the detection result supplied from the detection unit 12.

The sensor monitoring unit 21 monitors the state of the various sensors provided in the detection unit 12, refers to the sensor patterns and words registered in the correspondence database 22, and performs instruction to the activation word control unit 23. For example, when the user's action based on the detection result supplied from the detection unit 12 corresponds to a sensor pattern indicating a start condition to start using a predetermined word as an activation word, the sensor monitoring unit 21 instructs the activation word control unit 23 to use the word as the activation word. Further, at this time, the sensor monitoring unit 21 reads a sensor pattern indicating a termination condition for terminating using the word as the activation word from the correspondence database 22 and holds the sensor pattern. Then, in a state corresponding to the sensor pattern indicating the termination condition of the word used as the activation word is reached, the sensor monitoring unit 21 instructs the activation word control unit 23 to terminate using the word as the activation word.

As will be described later with reference to FIG. 2, in the correspondence database 22, various words to be used as activation words and sensor patterns indicating the start condition and termination condition of those words are registered in relation to each other.

The activation word control unit 23 controls the increase and decrease in the number of words used as activation words by registering a word in the activation word database 24 in response to an instruction from the sensor monitoring unit 21, and deleting a word from the activation word database 24.

In the activation word database 24, a word used as an activation word is registered.

The activation word recognition unit 25 performs speech recognition processing on the speech input from the speech input unit 13. When recognizing that the user has uttered the activation word registered in the activation word database 24 as a result of performing the speech recognition processing, the activation word recognition unit 25 notifies the application execution unit 14 of the fact.

In the information processing apparatus 11 configured as described above, it is possible to control the word used as the activation word to increase or decrease the number of activation words uttered by the user for activating the speech recognition function of the application execution unit 14 by the sensor monitoring unit 21 and the activation word control unit 23 on the basis of the detection result by the detection unit 12. This makes it possible to reduce malfunction due to noise or the like, for example, as compared with a configuration in which the speech recognition function of the application execution unit 14 is always active.

Further, in the information processing apparatus 11, the word that fits the view of the world provided by the application can be set as the activation word depending on the application executed by the application execution unit 14. As a result, it is possible to avoid giving a feeling that separates the user from the view of the world provided by the application, and provide better user experience.

Next, in FIG. 2, words and sensor patterns to be registered in the correspondence database 22 are shown.

In the correspondence database 22, all words used as activation words in the information processing apparatus 11 are registered. Then, in the correspondence database 22, in relation to the words, a sensor pattern indicating a start condition for starting use as an activation word, and a sensor pattern indicating a termination condition for finishing use as an activation word are registered. As the sensor pattern, for example, the operation of the user detected by the detection unit 12 and the elapsed time from the start of using the word as the activation word are registered.

For example, in the correspondence database 22, a sensor pattern indicating the start condition "35.6197 degrees of north latitude, 139.728553 degrees of east longitude, in the range of 10 m", and a sensor pattern indicating the termination condition "35.6197 of degrees north latitude, 139.728553 degrees of east longitude, outside the range of 10 m" have been registered in relation to the word "abracadabra".

Accordingly, for example, when the user moves within the range specified by the sensor pattern, the position information supplied to the sensor monitoring unit 21 as the detection result from the detection unit 12 indicates the state corresponding to the sensor pattern indicating the start condition. As a result, the sensor monitoring unit 21 instructs the activation word control unit 23 to use the word "abracadabra" as the activation word. After that, for example, when the user moves outside the range specified by the sensor pattern, the position information supplied to the sensor monitoring unit 21 as the detection result from the detection unit 12 indicates the state corresponding to the sensor pattern indicating the termination condition. As a result, the sensor monitoring unit 21 instructs the activation word control unit 23 to finish using the word "abracadabra" as the activation word.

Further, in the correspondence database 22, a sensor pattern indicating the start condition "User has jumped three times" and a sensor pattern indicating the termination condition "10 seconds have passed since start" are registered in relation to the word "jump".

Therefore, for example, when a detection result indicating that the user has jumped three times is supplied in response to the output of the acceleration sensor of the detection unit 12, the sensor monitoring unit 21 determines that the state corresponding to the sensor pattern indicating the start condition of the word "jump" has come. Then, the sensor monitoring unit 21 instructs the activation word control unit 23 to use the word "jump" as the activation word. At this time, the sensor monitoring unit 21 measures the elapsed time since the start of using the word "jump" as the activation word. After that, the sensor monitoring unit 21 determines at the timing when the elapsed time passes 10 seconds that the state corresponding to the sensor pattern indicating the termination condition has come, and instructs the activation word control unit 23 to finish using the word "jump" as the activation word.

Similarly, in the correspondence database 22, a sensor pattern indicating the start condition "User's walking speed is not less than 25 km/h" and a sensor pattern indicating the termination condition "User's walking speed is less than 25 km/h" are registered in relation to the word "acceleration apparatus". Therefore, for example, the sensor monitoring unit 21 controls use of the word "acceleration apparatus" as the activation word depending on the user's walking speed obtained from the output of the acceleration sensor, the gyro sensor, and the position sensor of the detection unit 12.

Further, in the correspondence database 22, a sensor pattern indicating the start condition "User has turned his/her face up" and a sensor pattern indicating the termination condition "User has faced forward" are registered in relation to the word "summon". For example, in the case where the information processing apparatus 11 is an eyeglass-type wearable terminal, the orientation of the user's face can be detected by the gyro sensor of the detection unit 12, and the sensor monitoring unit 21 controls use of the word "acceleration apparatus" as the activation word depending on the orientation of the user's face.

As described above, by referring to the sensor pattern registered in the correspondence database 22, the sensor monitoring unit 21 is capable of controlling use of the word associated with the respective sensor patterns as the activation word.

Note that in addition to the sensor patterns as shown in FIG. 2, for example, in the case where the user's action detected by the acceleration sensor or the like satisfies a predetermined condition, a predetermined word can be used as the activation word only for a certain period of time. Further, a predetermined word may be used as the activation word from the time first action is performed as the user's action until the time second action is performed. For example, it is possible to set the sensor pattern as a period of time from the time when the user tilts his/her face to the right side to the time when the user tilts his/her face to the left side, or a period of time from the time when the user swings up his/her arm to the time when the user swings down his/her arm.

Next, FIG. 3 shows the words to be registered in the activation word database 24.

For example, in the activation word database 24, a word "hello smartphone" that is set to be always used as the activation word is registered.

Then, as shown in the upper part of FIG. 3, assumption is made that when only the word "hello smartphone" is registered, for example, the user moves to "35.6197 degrees of north latitude, 139.728553 degrees of east longitude, in the range of 10 m", which is the sensor pattern shown in FIG. 2. In this case, the sensor monitoring unit 21 instructs the activation word control unit 23 to use the word "abracadabra" as the activation word. In response to this instruction, the activation word control unit 23 adds the word "abracadabra" to the activation word database 24 as shown in the middle part of FIG. 3.

After that, when the user moves to "35.6197 degrees of north latitude, 139.728553 degrees of east longitude, outside the range of 10 m", which is the sensor pattern, the sensor monitoring unit 21 instructs the activation word control unit 23 to finish using the word "abracadabra" as the activation word. Accordingly, the activation word control unit 23 deletes the word "abracadabra" from the activation word database 24 as shown in the lower part of FIG. 3.

Therefore, the activation word recognition unit 25 is capable of recognizing the word "abracadabra" as the activation word only when the user is in "35.6197 degrees of north latitude, 139.728553 degrees of east longitude, in the range of 10 m", which is the sensor pattern corresponding to the word "abracadabra" shown in FIG. 3.

Thus, for example, in the case where the application executed by the application execution unit 14 is a game in which adventure is performed using a spell, the information processing apparatus 11 is capable of using the word "abracadabra" as the activation word only when the user is at a place where a predetermined door is displayed in the game. Then, when the user utters a spell for opening the door, the spell can be recognized by the speech recognition function of the application execution unit 14, and an image such that the door is opened can be displayed. Meanwhile, for example, in the case where the user utters the usual word "hello smartphone" for the information processing apparatus 11 for activating the speech recognition function, it is predicted that uttering the word gives a feeling that separates the user from the view of the world of the game. Meanwhile, since the information processing apparatus 11 is capable of activating the speech recognition function of the application execution unit 14 by the user uttering the word "abracadabra" that fits the view of the world provided by the game, it is possible to provide user experience that fits the world view of the game.

Figure 4:
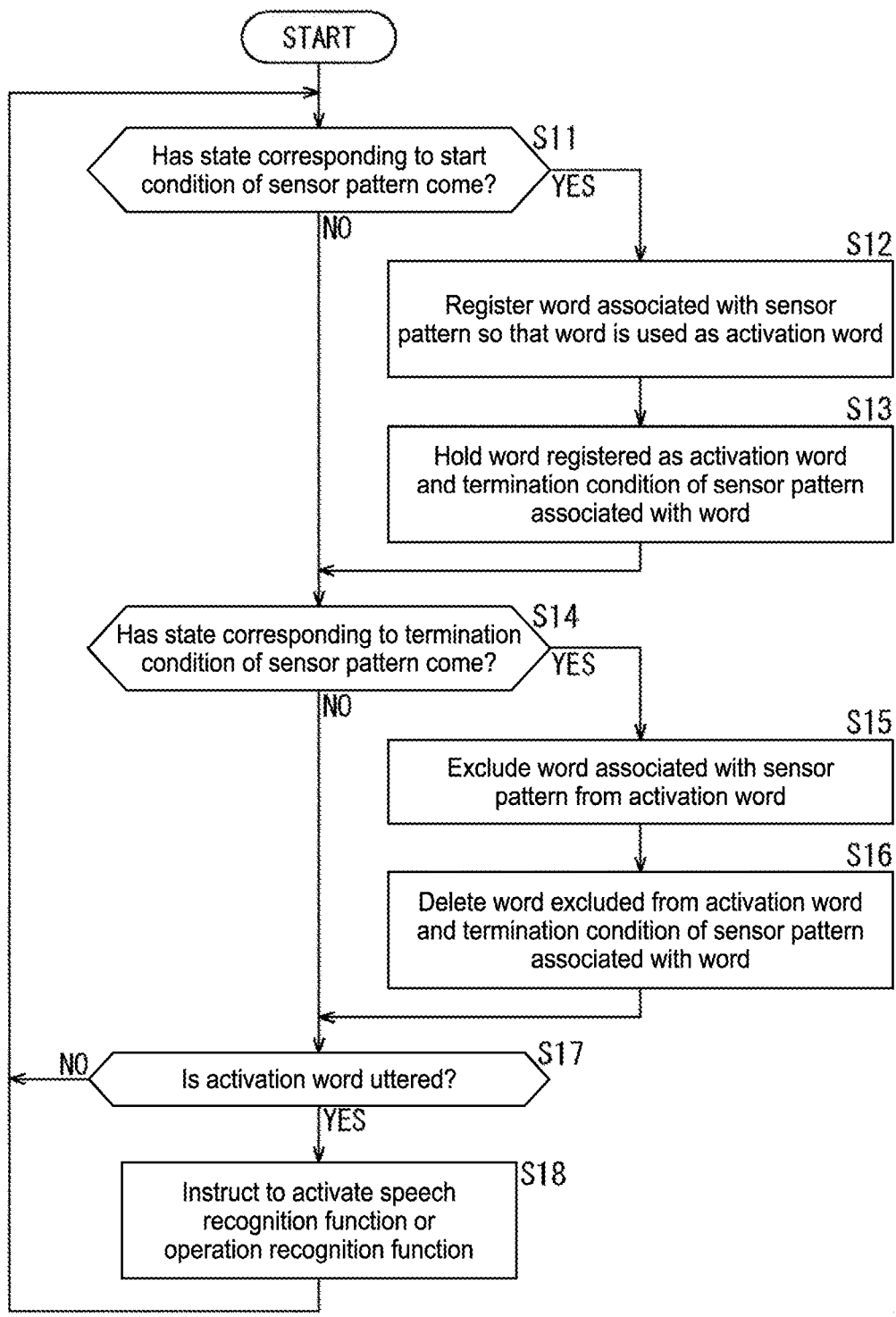
FIG. 4 is a flowchart describing activation word recognition control processing performed in an activation word recognition control apparatus.

Next, FIG. 4 is a flowchart describing activation word recognition control processing performed in the activation word recognition control unit 16.

For example, when an operation is performed on the information processing apparatus 11 to execute an application using the speech recognition by the application execution unit 14, activation word recognition control processing is started in the activation word recognition control unit 16. Then, in Step S11, the sensor monitoring unit 21 determines whether or not a state corresponding to the start condition of the sensor pattern registered in the correspondence database 22 has come on the basis of the detection result supplied from the detection unit 12.

In the case where the sensor monitoring unit 21 determines that the state corresponding to the start condition of the sensor pattern has come in Step S11, the processing proceeds to Step S12.

In Step S12, the sensor monitoring unit 21 instructs the activation word control unit 23 to use, as the activation word, the word associated with the sensor pattern for which it is determined that the state corresponding to the start condition has come. Accordingly, the activation word control unit 23 registers the word instructed from the sensor monitoring unit 21 in the activation word database 24 so that the word is used as the activation word.

In Step S13, the sensor monitoring unit 21 internally holds the word instructed to be used as the activation word in Step S12 and the termination condition of the sensor pattern associated with the word.

After the processing of Step S13 or when it is determined at Step S11 that the condition corresponding to the start condition of the sensor pattern has not come, the processing proceeds to Step S14.

In Step S14, the sensor monitoring unit 21 determines whether or not the condition corresponding to the termination condition of the sensor pattern registered in the correspondence database 22 has come on the basis of the detection result supplied from the detection unit 12.

In the case where the sensor monitoring unit 21 determines that the condition corresponding to the start condition of the sensor pattern has come in Step S14, the processing proceeds to Step S15.

In Step S15, the sensor monitoring unit 21 instructs the activation word control unit 23 to exclude, from the activation word, the word associated with the sensor pattern for which it is determined that the state corresponding to the start condition has come. Accordingly, the activation word control unit 23 deletes, from the activation word database 24, the word instructed from the sensor monitoring unit 21.

In Step S16, the sensor monitoring unit 21 internally deletes the word instructed to be excluded from the activation word in Step S15 and the termination condition of the sensor pattern associated with the word.

After the processing of Step S16 or when it is determined in Step S14 that the state corresponding to the termination condition of the sensor pattern has not come, the processing proceeds to Step S17.

In Step S17, the activation word recognition unit 25 determines whether or not the activation word registered in the activation word database 24 is uttered as a result of performing speech recognition processing on the speech input from the speech input unit 13.

In the case where it is determined that the activation word is uttered in Step S17, the processing proceeds to Step S18, and the activation word recognition unit 25 notifies the application execution unit 14 of that the activation word is uttered and instructs the application execution unit 14 to activate the speech recognition function. Accordingly, the speech recognition process is started in the application execution unit 14.

After the processing of Step S18 or when it is determined that the activation word is not uttered in Step S17, the processing returns to Step S11, and similar processing is repeated until the application execution unit 14 finishes executing the application.

As described above, the information processing apparatus 11 registers, when the user's action corresponds to the start condition of the sensor pattern, the word associated with the start condition so as to use the word as the activation word, and excludes, when the user's action corresponds to the termination condition of the sensor pattern, the word associated with the termination condition from the activation word. Thus, it is possible to reliably control increase and decrease in the number of activation words depending on the user's action.

Note that in the information processing apparatus 11, for example, the word that is registered in the activation word database 24 and recognizable as the activation word can be displayed on the display of the output unit 15. Accordingly, it is possible for the user to recognize available activation words.

Figure 5:
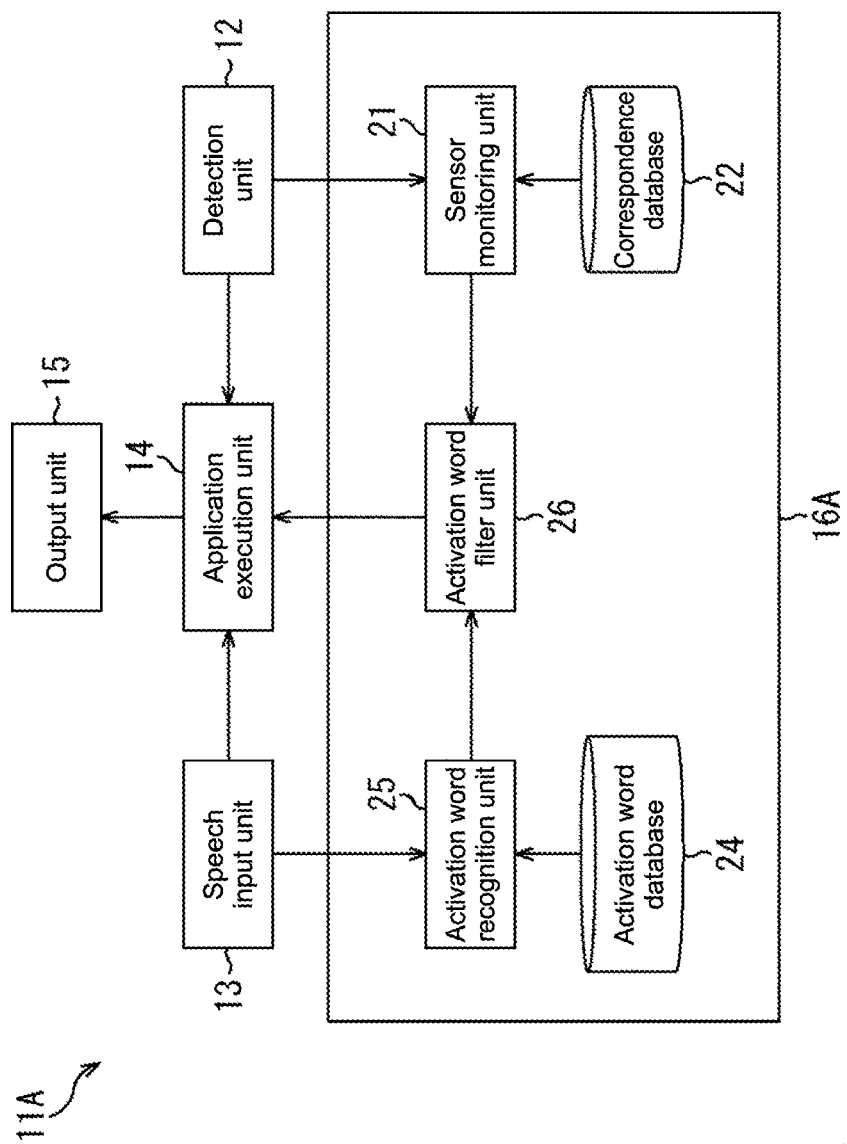
FIG. 5 is a block diagram showing a configuration example of a second embodiment of the information processing apparatus to which the present technology is applied.

Next, FIG. 5 is a block diagram showing a configuration example of a second embodiment of the information processing apparatus to which the present technology is applied.

As shown in FIG. 5, an information processing apparatus 11A includes the detection unit 12, the speech input unit 13, the application execution unit 14, the output unit 15, and an activation word recognition control unit 16A. Note that configurations of the detection unit 12, the speech input unit 13, the application execution unit 14, and the output unit 15 are similar to those of the information processing apparatus 11 in FIG. 1, and detailed description thereof will be omitted.

The activation word recognition control unit 16A includes the sensor monitoring unit 21, the correspondence database 22, the activation word database 24, the activation word recognition unit 25, and an activation word filter unit 26.

The sensor monitoring unit 21 monitors the state of the various sensors provided in the detection unit 12, refers to the sensor patterns registered in the correspondence database 22, and controls the activation word filter unit 26 to increase or decrease the number of words used as the activation words. In the correspondence database 22, the sensor patterns and words are registered as described above with reference to FIG. 2.

In the activation word database 24, words to be all activation words that may be used in the information processing apparatus 11A are registered in advance. The activation word recognition unit 25 performs speech recognition processing on the speech input from the speech input unit 13, and supplies, when recognizing that the word registered in the activation word database 24 is input, the word to the activation word filter unit 26.

The activation word filter unit 26 determines whether or not the word supplied from the activation word recognition unit 25 is a word instructed by the sensor monitoring unit 21 to be used as the activation word, thereby filtering the activation word. Then, in the case where the word supplied from the activation word recognition unit 25 is a word instructed by the sensor monitoring unit 21 to be used as the activation word, the activation word filter unit 26 notifies the application execution unit 14 of that the user has uttered the activation word. Meanwhile, in the case where the word supplied from the activation word recognition unit 25 is not a word instructed by the sensor monitoring unit 21 to be used as the activation word, the activation word filter unit 26 determines that the user has not uttered the activation word.

The information processing apparatus 11A configured as described above is capable of reliably recognizing the activation word.

That is, in the information processing apparatus 11 in FIG. 1, by increasing or decreasing the number of words recognized as the activation word by the activation word recognition unit 25, it is possible to keep the minimum number of words, thereby maintaining high recognition performance. However, in the information processing apparatus 11 in FIG. 1, since the activation word is registered in the activation word database 24 after the detection result by the detection unit 12 is changed, in the case where it takes time to perform processing of registering the activation word, the response corresponding to the increase or decrease in the number of activation words is delayed. Therefore, for example, there is a possibility that when the activation word is uttered during registration of the activation word, the word cannot be recognized.

Meanwhile, since the processing of registering the activation word in the activation word database 24 is not performed in the information processing apparatus 11A, it is possible to reliably deal with the increase or decrease in the number of activation words as compared with the information processing apparatus 11, and avoid situations where the activation word cannot be recognized. Thus, the information processing apparatus 11A is capable of more reliably recognizing the activation word.

Figure 6:
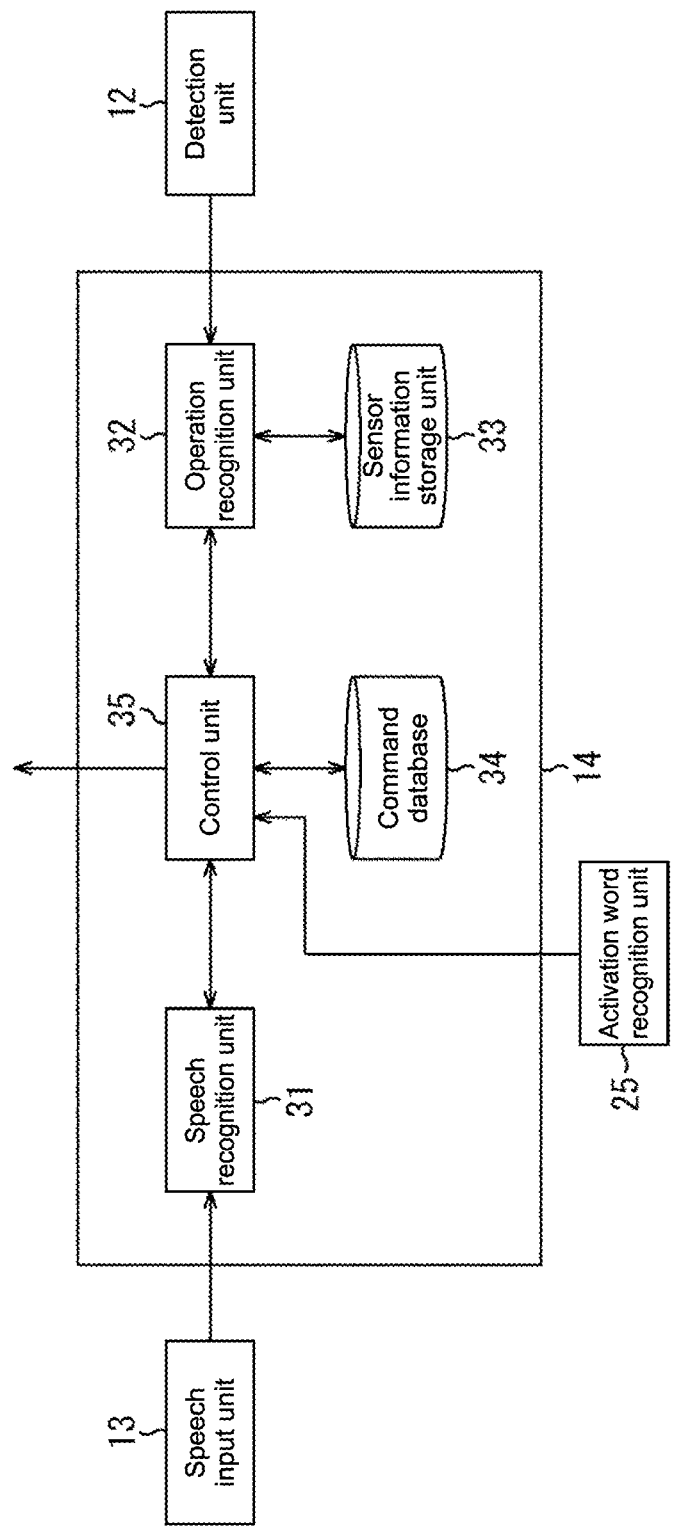
FIG. 6 is a block diagram showing a configuration example of an application execution apparatus.

Next, FIG. 6 is a block diagram showing a configuration example of the application execution unit 14.

As shown in FIG. 6, the application execution unit 14 includes a speech recognition unit 31, an operation recognition unit 32, a sensor information storage unit 33, a command database 34, and a control unit 35.

The speech recognition unit 31 starts speech recognition under the control of the control unit 35, and performs speech recognition processing on speech input from the speech input unit 13. For example, when the user utters a command used in the application executed by the application execution unit 14, the speech recognition unit 31 recognizes the speech of the command, and supplies the recognition result and time information relating to the speech to the control unit 35.

The operation recognition unit 32 performs operation recognition processing based on the detection results detected by the various sensors provided in the detection unit 12, and recognizes the user operation. For example, the operation recognition unit 32 recognizes the direction in which the user swings down his/her arm, the direction in which the face and body of the user faces, and the like, depending on the type of the sensor provided in the detection unit 12, and causes the sensor information storage unit 33 to store the operation recognition result as sensor information. Further, when receiving an inquiry about the sensor information from the control unit 35, the operation recognition unit 32 supplies, to the control unit 35, the operation recognition result corresponding to the inquired sensor information among the current sensor information supplied from the detection unit 12 and the sensor information stored in the sensor information storage unit 33.

The sensor information storage unit 33 stores the sensor information obtained by the operation recognition processing by the operation recognition unit 32.

As shown in FIG. 7 to be described later, in the command database 34, commands used in the application executed in the application execution unit 14, the time range, and the sensor information are registered in relation to each other.

When the activation word recognition unit 25 of the activation word recognition control unit 16 recognizes an activation word and an instruction to activate the speech recognition is input from the activation word recognition unit 25, the control unit 35 performs activation control on the speech recognition unit 31 so as to cause the speech recognition unit 31 to start the speech recognition processing. Then, the control unit 35 refers to the command database 34 on the basis of the speech recognition result of the command and the time information supplied from the speech recognition unit 31, and inquires the operation recognition unit 32 about the operation recognition result by using the sensor information associated with the recognized command. After that, the control unit 35 supplies the output depending on the operation recognition result from the operation recognition unit 32 to the output unit 15. Note that for example, an instruction to activate the speech recognition is input from the activation word filter unit 26 (FIG. 5) to the control unit 35, and similar processing is performed in the configuration of the information processing apparatus 11A shown in FIG. 5.

For example, in FIG. 7, an example of the command database 34 is shown.

As shown in FIG. 7, in the command database 34, commands, time ranges, and sensor information are registered in relation to each other.

For example, a time range "within 3 seconds after uttering speech" and sensor information "direction in which right hand has been swung down" are associated with a command "emit beam". That is, it is recognized by the speech recognition unit 31 that the command "emit beam" is uttered in response to the command "emit beam" uttered by the user, and the operation recognition unit 32 supplies the direction in which the user swings down his/her right arm within 3 seconds after the uttering is finished to the control unit 35 as the operation recognition result. In response to the operation recognition result, the control unit 35 performs an output (e.g., displaying the effect of the beam) corresponding to the command "emit beam" in the direction in which the user swings down his/her right arm.

Further, a time range "right after uttering" and sensor information "direction in which body faces" are associated with a command "launch rocket". That is, it is recognized by the speech recognition unit 31 that the command "launch rocket" is uttered in response to the command "launch rocket" uttered by the user, and the operation recognition unit 32 supplies the direction in which the body of the user faces right after the speech is finished to the control unit 35 as the operation recognition result. In response to the operation recognition result, the control unit 35 performs an output (e.g., displaying the effect of the launched rocket going forward) corresponding to the command "launch rocket" in the direction in which the body of the user faces.

Further, a time range "from beginning of speech section 0.1 seconds before to end of speech" and sensor information "range of direction in which right hand has faced" are associated with a command "mow down". That is, the operation recognition unit 32 supplies the range of the direction in which the user's right hand has faced from the time right before (0.1 seconds before) it is recognized by the speech recognition unit 31 that the command "mow down" is uttered in response to the command "mow down" uttered by the user to the time when the uttering is finished to the control unit 35 as the operation recognition result.

Further, a time range "end time of word "here" in speech recognition result" and sensor information "direction in which face of user has faced, position of user" are associated with "mark here". That is, the operation recognition unit 32 supplies, to the control unit 35 as the operation recognition result, the direction in which the face of the user has faced and the position of the user at the time when uttering of the word "here" is finished in uttering of the command "mark here" recognized by the speech recognition unit 31 in response to the command "mark here" uttered by the user. In response to the operation recognition result, the control unit 35 performs an output (e.g., fixed display of a mark) corresponding to the command "mark here" at the position in front of the direction in which the body of the user faces (position in front of the user's eyes).

As described above, in the command database 34, in relation to the command recognized by the speech recognition unit 31, the time range based on the time when the command has been uttered and the sensor information (orientation, range of orientation, direction, altitude, etc.) recognized by the operation recognition unit 32 are registered.

Now, an example of processing performed in the application execution unit 14 when the user utters the command "emit beam" will be described with reference to FIG. 8.

For example, assumption is made that the information processing apparatus 11 is a wrist watch type wearable terminal and is capable of detecting the motion and direction of the user's arm by the geomagnetic sensor and the gyro sensor provided in the detection unit 12. In this case, for example, as described above, it is possible to start the speech recognition processing by the speech recognition unit 31 not only when detecting uttering of the activation word but also when detecting that the user has raised his/her right hand as shown in the top stage of FIG. 8.

When it is recognized that the activation word is uttered by the user or predetermined operation (raising right hand in this example) is performed by the user, and the control unit 35 is instructed to activate the speech recognition processing from the activation word recognition control unit 16, the control unit 35 performs processing of instructing the speech recognition unit 31 to start the speech recognition processing. Then, the control unit 35 waits until the speech recognition unit 31 recognizes the speech command uttered by the user.

Figure 8:
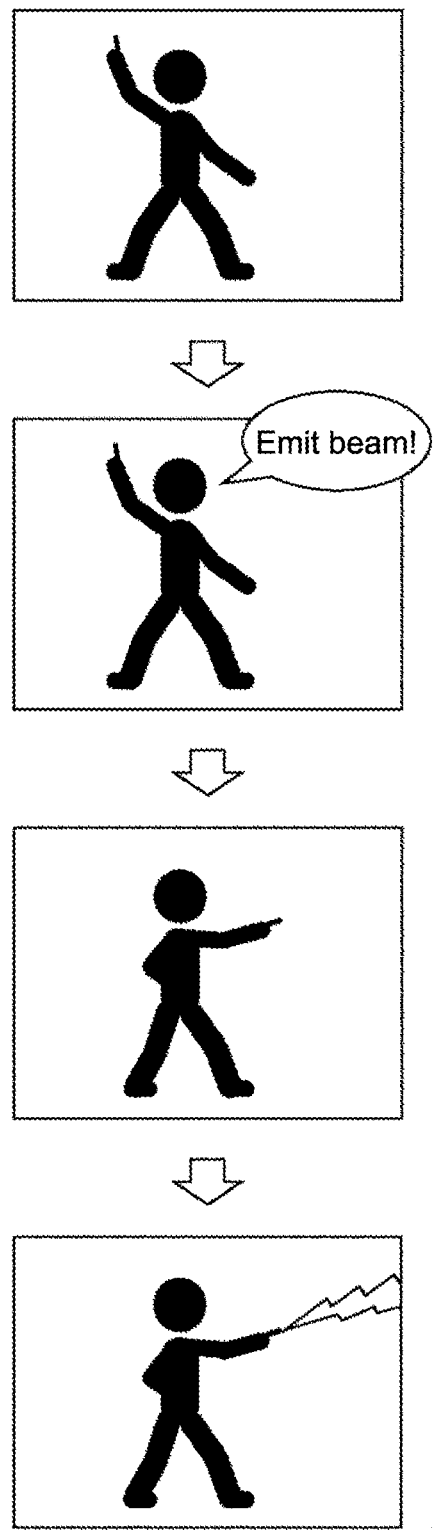
FIG. 8 is a diagram describing processing performed in an application execution unit.

Then, when the user utters the command "emit beam" as shown in the second stage from the top of FIG. 8, the speech recognition unit 31 supplies, to the control unit 35, the recognition result indicating that the command "emit beam" has been recognized and the time information indicating the time when the command "emit beam" has been uttered.

In response to this, the control unit 35 reads the time range and sensor information associated with the command "emit beam" recognized by the speech recognition unit 31 from the command database 34, and requests sensor information in the time range to the operation recognition unit 32.

After that, as shown in the third stage from top of FIG. 8, the user performs operation of swing down the raised right hand. When the detection unit 12 supplies the detection result indicating that such operation has been performed to the operation recognition unit 32, the operation recognition unit 32 obtains the direction in which the right hand of the user has been swung down as the operation recognition result, and supplies the obtained direction to the control unit 35.

Then, the control unit 35 causes the display of the output unit 15 to display an augmented-reality image expressing the effect as if the beam was emitted in the direction in which the right hand of the user has been swung down as shown in the fourth stage from top of FIG. 8.

As described above, the application execution unit 14 is capable of recognizing the operation of the user on the basis of the time when the user has uttered the command, and performing an output suitable for the operation of the user.

Figure 9:
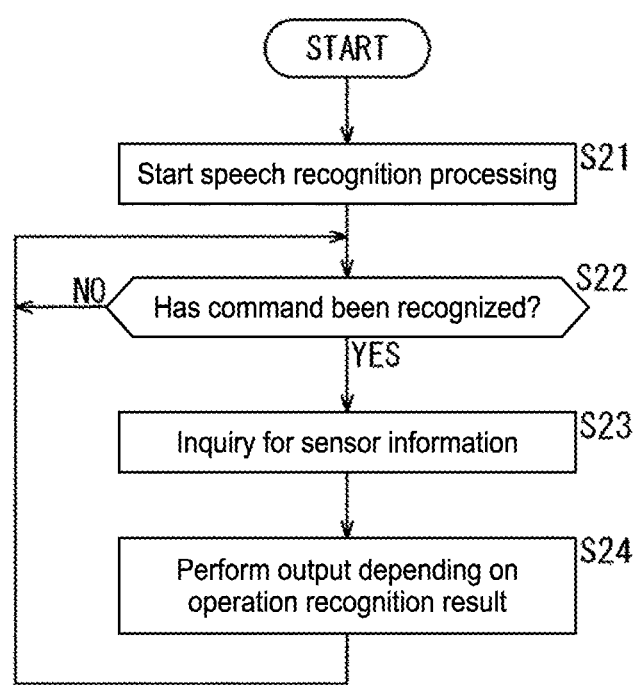
FIG. 9 is a flowchart describing processing performed in the application execution unit.

Next, processing of the application using the speech recognition performed by the application execution unit 14 will be described with reference to the flowchart of FIG. 9.

For example, when an activation word is recognized by the activation word recognition unit 25 of the activation word recognition control unit 16, processing is started. In Step S21, the control unit 35 performs control to cause the speech recognition unit 31 to start speech recognition processing.

In Step S22, the control unit 35 determines whether or not a command is recognized by the speech recognition unit 31, and waits for processing until it is determined by the speech recognition unit 31 that a command is recognized. Then, when the speech recognition result of the command and the time information is supplied from the speech recognition unit 31, the control unit 35 determines that the command is recognized, and the processing proceeds to Step S23.

In Step S23, the control unit 35 refers to the command database 34, and inquires the operation recognition unit 32 about the sensor information associated with the recognized command.

In Step S24, the operation recognition unit 32 supplies the operation recognition result corresponding to the inquired sensor information to the control unit 35, and the control unit 35 supplies an output depending on the operation recognition result to the output unit 15.

After the processing of Step S24, the processing returns to Step S22, and similar processing is repeated thereafter.

As described above, the application execution unit 14 is capable of performing processing in which the command uttered by the user and the operation of the user based on the time when the command is uttered are integrated. Accordingly, the application execution unit 14 is capable of performing an output depending on the command and the operation by causing the user to perform the command and the operation that fit the view of the world provided by the application.

For example, in the case where the information processing apparatus 11 is an eyeglass type wearable terminal and the output unit 15 is capable of displaying an image superimposed on the user's view, when the user utters the command "acceleration apparatus" while running, it is possible to cause the output unit 15 to display the visual effect relating to the running direction. Note that the visual effect relating to the running direction may be displayed when detecting that the user has started running after uttering the command "acceleration apparatus".

Further, for example, in the case where the information processing apparatus 11 is a wrist watch type wearable terminal, the right hand is swung out from above in a certain direction, which is used as a trigger to make it possible to input a voice command (e.g., "emit beam"), and the direction in which information is output (e.g., "direction of beam") can be set as the direction of the swung down right hand, depending on the speech command recognized thereafter. Further, in the information processing apparatus 11, when the user utters the command "set trap" at a predetermined position, it is possible to acquire the position information, and set a trap corresponding to the command on the game executed by the application execution unit 14.

As described above, in the information processing apparatus 11, by detecting the operation (gesture) of the user based on the time when the user utters the command, it is possible to perform various outputs depending on the application executed by the application execution unit 14. Further, depending on the words "this, this, and this" consecutively uttered by the user, the information processing apparatus 11 is capable of recognizing the objects instructed by the user in cooperation with the time when each "this" is recognized and the direction of the user's hand at that time. That is, the control unit 35 recognizes, at the time when the speech recognition unit 31 recognizes a word indicating an object, which is uttered by the user, an object in front of the user's hand in the direction recognized by the operation recognition unit 32 as the object instructed by the user. In this way, the information processing apparatus 11 is capable of designating an actual object rather than a display object displayed on a screen.

Further, the information processing apparatus 11 is capable of using the operation of the user detected by the detection unit 12 for determining the separation of words when the speech recognition unit 31 performs speech recognition.

Note that as the sensor provided in the detection unit 12 of the information processing apparatus 11, an altitude sensor, a geomagnetic sensor, a light sensor, a blood glucose sensor, a body temperature sensor, a clock, and a pedometer can be used. For example, by using the altitude sensor, a predetermined word can be used as an activation word only when the user is at a position higher/lower than or equal to a certain height. Further, by using the geomagnetic sensor, a predetermined word can be used as an activation word only when heading in a certain direction. Further, by using the light sensor, a predetermined word can be used as an activation word only in bright places or dark places. Further, by using the blood glucose sensor, the clock, and the pedometer, a predetermined word can be used as an activation word only when the user is hungry, only at a predetermined time, and only after walking a predetermined number of steps, respectively.

Further, these may be used in combination. For example, by using the altitude sensor and the position sensor in combination, a predetermined word may be used as an activation word when the user moves to the rooftop of a building at a predetermined position. Further, in the case where the information processing apparatus 11 includes an imaging device, a predetermined word may be used as an activation word when a specific object is imaged.

Note that in the information processing apparatus 11, when a specific application is being executed in the application execution unit 14, e.g., when a game using a spell is executed, the use of the word used as the activation word at the normal time (word "hello smartphone" shown in FIG. 3) as the activation word for activating speech recognition can be prohibited. Further, in the information processing apparatus 11, when a state corresponding to the sensor pattern as described above with reference to FIG. 2 has come, the speech recognition function may be automatically activated.

Note that the processing described with reference to the above-mentioned flowcharts does not necessarily need to be performed in time series in the order described as the flowcharts and also includes processing performed in parallel or individually (e.g., parallel processing or processing that uses object). Further, the program may be processed by one CPU, or may be processed dispersively by a plurality of CPUs.

Further, the above-mentioned sequence of processing (information processing method) can be performed by hardware or software. If the sequence of processing is performed by software, programs configuring the software are installed into a computer from a program recording medium in which the programs are stored. Here, the computer includes a computer incorporated in dedicated hardware and, for example, a generally-used personal computer that installs various programs to be able to execute various functions.

Figure 10:
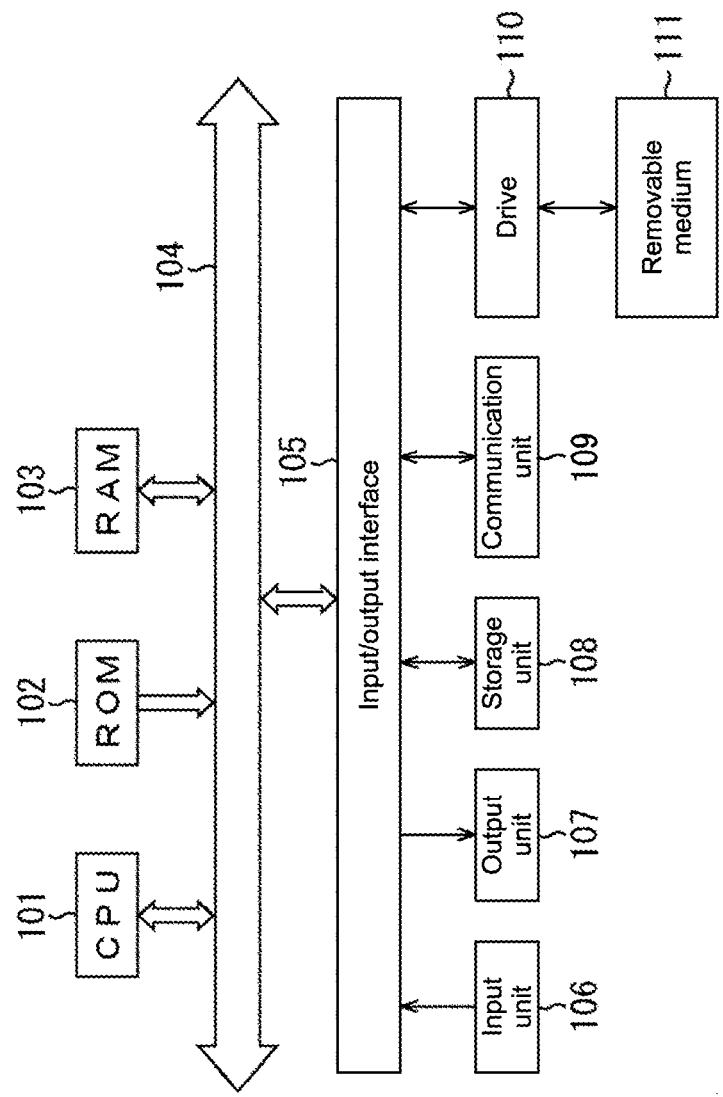
FIG. 10 is a block diagram showing a configuration example of an embodiment of a computer to which the present technology is applied.

FIG. 10 is a block diagram showing a configuration example of hardware of a computer executing the above-mentioned sequence of processing by a program.

In the computer, a CPU (Central Processing Unit) 101, a ROM (Read Only Memory) 102, and a RAM (Random Access Memory) 103 are connected to each other via a bus 104.

Further, an input/output interface 105 is connected to the bus 104. An input unit 106 including a keyboard, a mouse, a microphone, and the like, an output unit 107 including a display, a speaker, and the like, a storage unit 108 including a hard disk or a non-volatile memory, a communication unit 109 including a network interface and the like, and a drive 110 for driving a removable medium 111 including a magnetic disc, an optical disc, a magnetic optical disc, a semiconductor memory or the like are connected to the input/output interface 105.

In the computer configured as described above, by the CPU 101 loading programs stored in, for example, the storage unit 108 into the RAM 103 via the input/output interface 105 and the bus 104 and executing the programs, the above-mentioned sequence of processing is performed.

The program that is executed by the computer (the CPU 101) can be recorded, for example, in the removable medium 111 that is a package medium including a magnetic disc (including a flexible disc), an optical disc (CD-ROM (Compact Disc-Read Only Memory), DVD (Digital Versatile Disc), and the like), a magnetic optical disc, or a semiconductor memory and thus may be provided. Alternatively, the program is provided via a wired or wireless transmission medium such as a local area network, the Internet, and digital satellite broadcasting.

Then, the program can be installed in the storage unit 108 via the input/output interface 105 by mounting the removable medium 111 onto the drive 110. Further, the program can be received with the communication unit 109 via the wired or wireless transmission medium and installed in the storage unit 108. In addition, the program can be installed in advance in the ROM 102 or the storage unit 108.

Note that the present technology may also take the following configurations.

(1)

An information processing apparatus, including:
 an activation word setting unit that sets, on the basis of a detection result of detecting a user operation, a word used as an activation word for activating a predetermined function, the activation word being uttered by a user, the number of activation words being increased or decreased by the setting; and
 an activation word recognition unit that performs speech recognition on speech uttered by the user and recognizes that the word set by the activation word setting unit to be used as the activation word is uttered.

(2)

The information processing apparatus according to (1) above, in which
 the activation word setting unit registers, when the user's operation corresponds to a start condition for starting using a predetermined word as the activation word, a word associated with the start condition to use the word as the activation word.

(3)

The information processing apparatus according to (2) above, in which
 the activation word setting unit excludes, when the predetermined word is registered to be used as the activation word and the user operation corresponds to a termination condition for finishing using the predetermined word as the activation word, the predetermined word from the activation word.

(4)

The information processing apparatus according to (2) above, in which
 the activation word setting unit measures, when elapsed time from the time of the start condition is set as a termination condition for finishing using the predetermined word as the activation word, time since the predetermined word is registered to be used as the activation word, and excludes, when the elapsed time passes, the predetermined word from the activation word.

(5)

The information processing apparatus according to any one of (1) to (4) above, in which
 the activation word setting unit controls, on the basis of position information supplied as the detection result, increase and decrease in the number of words used as the activation words depending on a position of the user.

(6)

The information processing apparatus according to any one of (1) to (5) above, in which
 the activation word setting unit controls, on the basis of at least acceleration information supplied as the detection result, increase and decrease in the number of words used as the activation words depending on the user operation.

(7)

The information processing apparatus according to any one of (1) to (6) above, further including
 an application execution unit that starts, when it is recognized by the activation word recognition unit that the user utters the activation word, speech recognition processing in an application using speech recognition.

(8)

The information processing apparatus according to (1) above, in which
 the activation word recognition unit performs speech recognition on all words that may be used as the activation words, and
 the activation word setting unit deals with increase and decrease in the number of the activation words by performing filtering on the word recognized by the activation word recognition unit with whether or not the word is the word used as the activation word depending on the detection result of detecting the user operation.

(9)

The information processing apparatus according to (7) above, in which
 the application execution unit includes
  a speech recognition unit that recognizes that the user utters a predetermined command,
  an operation recognition unit that recognizes the user's operation corresponding to the command in a time range based on the time when the command recognized by the speech recognition unit is uttered, and
  a control unit that performs an output corresponding to the command depending on an operation recognition result by the operation recognition unit.

(10)

The information processing apparatus according to (9) above, in which
 the operation recognition unit recognizes a direction in which a body of the user faces when the uttering of the command recognized by the speech recognition unit is finished, and
 the control unit performs an output corresponding to the command in the direction recognized by the operation recognition unit.

(11)

The information processing apparatus according to (9) or (10) above, in which
 the operation recognition unit recognizes a direction in which the user swings down his/her arm within a predetermined time range from the time when the command recognized by the speech recognition unit is uttered, and
 the control unit performs an output corresponding to the command in the direction recognized by the operation recognition unit.

(12)

The information processing apparatus according to any one of (9) to (11) above, in which
 the control unit recognizes, at the time when the speech recognition unit recognizes a word indicating an arbitrary object, an object in front of a hand of the user in the direction recognized by the operation recognition unit as an object instructed by the user.

(13)

An information processing method, including the steps of:
 setting, on the basis of a detection result of detecting a user operation, a word used as an activation word for activating a predetermined function, the activation word being uttered by a user, the number of activation words being increased or decreased by the setting; and performing speech recognition on speech uttered by the user and recognizing that the word set to be used as the activation word is uttered.

(14)

A program that causes a computer to execute information processing including the steps of:

setting, on the basis of a detection result of detecting a user operation, a word used as an activation word for activating a predetermined function, the activation word being uttered by a user, the number of activation words being increased or decreased by the setting; and performing speech recognition on speech uttered by the user and recognizing that the word set to be used as the activation word is uttered.

Note that embodiments of the present technology are not limited to the above-mentioned embodiments, and various modifications can be made without departing from the essence of the present disclosure.

REFERENCE SIGNS LIST 11 information processing apparatus
12 detection unit
13 speech input unit
14 application execution unit
15 output unit
16 activation word recognition control unit
21 sensor monitoring unit
22 correspondence database
23 activation word control unit
24 activation word database
25 activation word recognition unit
26 activation word filter unit
31 speech recognition unit
32 operation recognition unit
33 sensor information storage unit
34 command database
35 control unit

The invention claimed is:

1. An information processing apparatus, comprising:
at least one sensor configured to detect an operation of a user; and
at least one processor configured to:
  set, based on the detected operation of the user, a first word as an activation word to activate a function, wherein
    the activation word is uttered by the user, and
    a count of activation words is based on the setting of the first word as the activation word;
  execute a speech recognition operation on a speech uttered by the user;
  recognize the activation word from the speech uttered by the user;
  recognize a direction of a hand of the user;
  recognize a second word from the speech uttered by the user, wherein the second word indicates an arbitrary object;
  recognize an object in front of the hand of the user as the arbitrary object, wherein the arbitrary object is recognized in the direction of the hand of the user; and
  execute an output operation corresponding to the recognized object.

2. The information processing apparatus according to claim 1, wherein the operation of the user corresponds to a start condition to start a usage of the first word as the activation word, and the at least one processor is further configured to register the first word in association with the start condition.

3. The information processing apparatus according to claim 2, wherein the at least one processor is further configured to exclude the first word from a set of activation words based on the registration of the first word as the activation word and the operation of the user that corresponds to a termination condition to finish the usage of the first word as the activation word.

4. The information processing apparatus according to claim 2, wherein the at least one processor is further configured to:
  register elapsed time from a time of start of the start condition as a termination condition to finish the usage of the first word as the activation word;
  measure time since the first word is used as the activation word; and
  exclude the first word as the activation word based on a result of the measurement indicating passage of the elapsed time.

5. The information processing apparatus according to claim 1, wherein the at least one processor is further configured to:
  receive a position of the user based on the detection of the operation of the user; and
  change the count of the activation words based on the position of the user.

6. The information processing apparatus according to claim 1, wherein the at least one processor is further configured to:
  receive acceleration information based on the detection of the operation of the user; and
  change the count of the activation words based on the received acceleration information.

7. The information processing apparatus according to claim 1, wherein the at least one processor is further configured to start the speech recognition operation in an application based on the recognition of the activation word from the speech uttered by the user.

8. The information processing apparatus according to claim 7, wherein the at least one processor is further configured to:
  recognize a command from the speech uttered by the user;
  recognize the operation of the user corresponding to the command, wherein the operation is recognized in a first time range based on a time at which the command is uttered; and
  execute the output operation corresponding to the command.

9. The information processing apparatus according to claim 8, wherein the at least one processor is further configured to:
  recognize a direction of a body of the user at the time at which the command is uttered; and
  execute the output operation corresponding to the command in the recognized direction.

10. The information processing apparatus according to claim 8, wherein the at least one processor is further configured to:
  recognize a direction of a swing of an arm of the user within a second time range from the time at which the command is uttered; and execute the output operation corresponding to the command in the recognized direction.

11. The information processing apparatus according to claim 1, wherein the at least one processor is further configured to:
   execute the speech recognition operation on all words set as the activation words;
   filter the recognized activation word based on the detection of the operation of the user; and
   change the count of the activation words based on the filter of the recognized activation word.

12. The information processing apparatus according to claim 1, wherein the operation of the user corresponds to at least one of a position of the user, a movement state of the user, or an orientation of a face of the user.

13. An information processing method, comprising:
   in an information processing apparatus comprising at least one sensor and at least one processor:
      detecting, by the at least one sensor, an operation of a user;
      setting, by the at least one processor based on the detected operation of the user, a first word as an activation word to activate a function, wherein
         the activation word is uttered by the user, and
         a count of activation words is based on the setting of the first word as the activation word;
      executing, by the at least one processor, a speech recognition operation on a speech uttered by the user;
      recognizing, by the at least one processor, the activation word from the speech uttered by the user;
      recognizing, by the at least one processor, a direction of a hand of the user;
      recognizing, by the at least one processor, a second word from the speech uttered by the user, wherein the second word indicates an arbitrary object;
      recognizing, by the at least one processor, an object in front of the hand of the user as the arbitrary object, wherein the arbitrary object is recognized in the direction of the hand of the user; and
      executing an output operation corresponding to the recognized object.

14. A non-transitory computer-readable medium having stored thereon, computer-executable instructions that, when executed by a computer, cause the computer to execute operations, the operations comprising:
   detecting, by at least one sensor, an operation of a user;
   setting, based on the detected operation of the user, a first word as an activation word to activate a function, wherein
      the activation word is uttered by the user, and
      a count of activation words is based on the setting of the first word as the activation word;
   executing a speech recognition operation on a speech uttered by the user;
   recognizing the activation word from the speech uttered by the user;
   recognizing a direction of a hand of the user;
   recognizing a second word from the speech uttered by the user, wherein the second word indicates an arbitrary object;
   recognizing an object in front of the hand of the user as the arbitrary object, wherein the arbitrary object is recognized in the direction of the hand of the user; and
   executing an output operation corresponding to the recognized object.

* * * * *